Sept. 27, 1955  E. O. ESSARY ET AL  2,718,872
ATTACHMENT FOR POULTRY FEED TROUGHS
Filed Feb. 17, 1954  2 Sheets-Sheet 1

INVENTORS
Eskel O. Essary
Merritt I. Darrow
BY R.G. Story
ATTORNEY

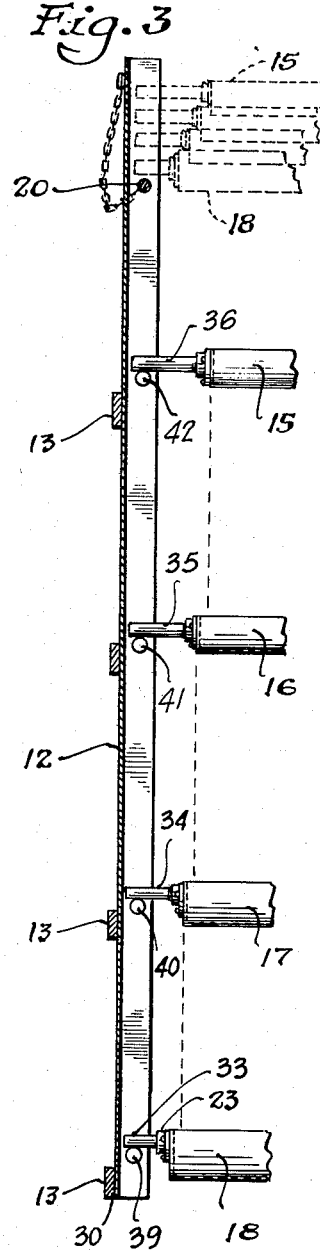
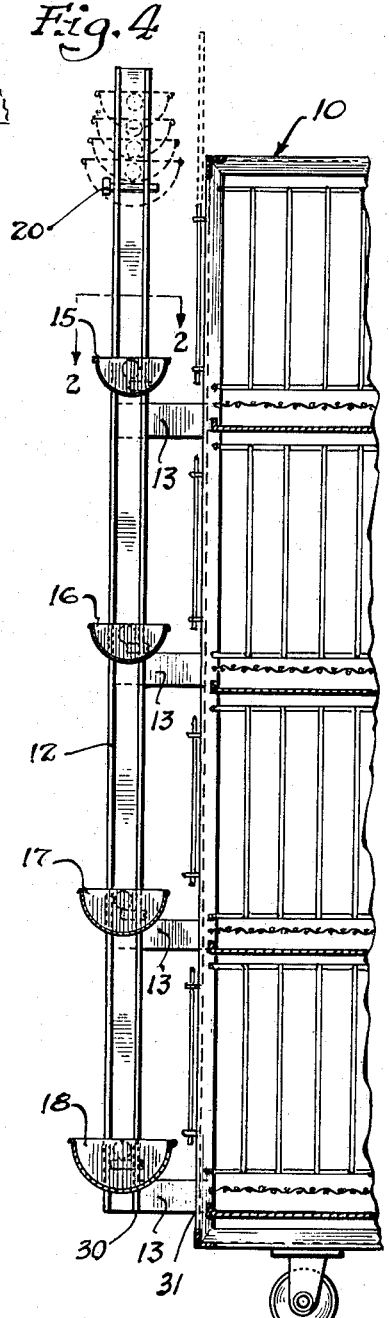
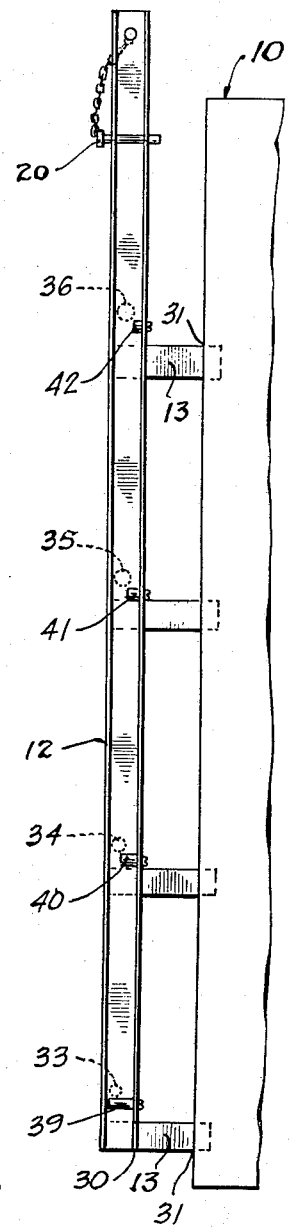

United States Patent Office 2,718,872
Patented Sept. 27, 1955

2,718,872
ATTACHMENT FOR POULTRY FEED TROUGHS

Eskel O. Essary, Park Forest, and Merritt I. Darrow, Chicago, Ill., assignors to Swift & Company, Chicago, Ill., a corporation of Illinois Application February 17, 1954, Serial No. 410,784

3 Claims. (Cl. 119—18)

This invention pertains to an improvement in the manner of supporting troughs to a battery of the type used principally in the station feeding of poultry.

It is common practice today to station feed poultry a few days before slaughtering to obtain an additional gain in weight. This is customarily done through the use of compact feeding batteries having four or five superposed decks. Each deck, which is generally closed by a woven wire fence, has a feeding trough outside the wire of the deck and within reach of the poultry which feed by reaching through the wire into the adjacent trough.

In large scale packing operations the feeding batteries are moved onto the slaughtering floor and there the birds are taken out and killed. The troughs are removed to gain unhampered access to the several decks and to avoid spilling of feed through accidental brushing. Since the feeding troughs of each deck are individually suspended or supported by appropriate brackets, this manner of support requires considerable labor to remove the troughs which are then ordinarily stacked at a distance from the battery to give a clear working space. The troughs when removed are frequently misplaced and, of course, must be returned to the battery when it is used to feed another group of poultry.

We have devised an attachment which obviates the necessity of individually removing the troughs of each deck to reach the poultry of that deck. In the feeding trough attachment of our invention we provide means which permits the vertical movement of the several troughs into a nestled position away from several decks to a position out of the way of those working around the battery. More specifically, the feeding trough attachment of our invention is made up of two spaced, vertically-disposed upright members attached to the feeding battery, with a plurality of horizontally-disposed feed troughs being disposed between and movably carried by these two upright members. The troughs are movable in a vertical direction. Means are provided for holding a single one of the troughs in feeding position opposite each one of the decks of the battery. The troughs may be held in a nestled position upon vertical movement of these troughs away from their respective decks. By nestling the troughs in this manner away from the decks, the poultry may be readily reached and removed.

In the accompanying drawing:

Figure 3 is an enlarged partial front view, also partially in cross-section, of the trough attachment of the battery of Figure 1;

Figure 4 is a vertical cross-section taken along line 4—4 of Figure 1; and

Figure 5 is a vertical cross-section of the battery taken along the same sectional line of Figure 1 as Figure 4 with the troughs removed to more clearly illustrate the manner of supporting the troughs.

Figure 1:
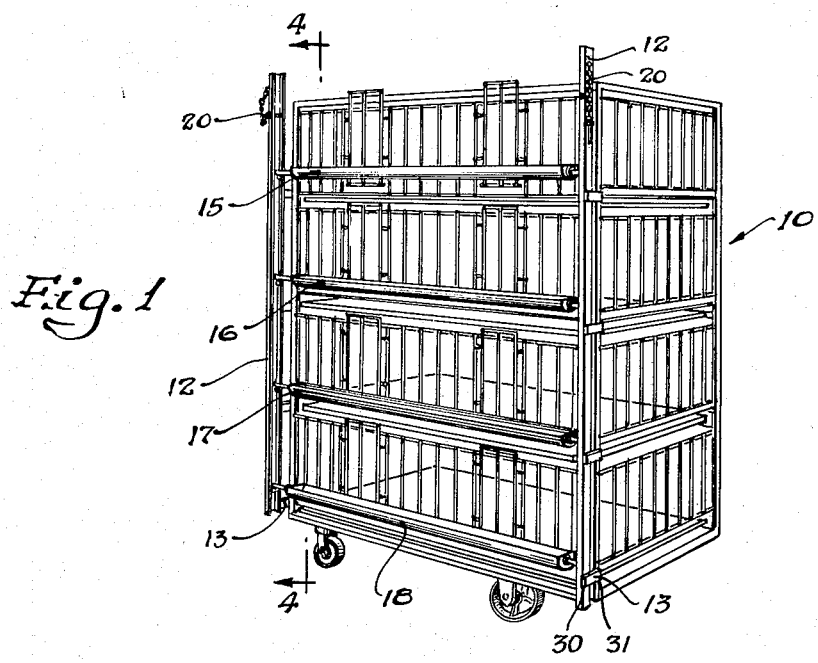
Figure 1 is a perspective view of a conventional feeding battery with the trough attachment of the invention in place.

In Figure 1 there is illustrated a conventional feeding battery 10 having four decks to which has been fastened the poultry trough attachment of our invention. In station feeding, trough attachments are placed on each side of the battery. The attachment is made up of two metal upright channel members 12 which are fastened to opposite corners of the same side of the battery by suitable brackets 13. Each of the brackets is welded at one end 30 to its respective channel members and at the other end 31 to the battery. The upright channel members are U-shaped in cross-section (Fig. 2) with the channel of each opening toward the other member.

In the embodiment illustrated, four round-bottom troughs 15, 16, 17, and 18 are carried between the channel members in a superposed position, with each succeeding lower trough having a cross-section somewhat larger than the trough immediately above. By progressively varying the cross-section of the troughs it is possible, upon moving of the four troughs vertically into a group (as illustrated by the dotted position of Figures 3 and 4), to obtain a more compact nest. The nestled troughs are held in position by two locking pins 20 which extend crosswise through the respective channel members under the lower trough of the nest. The preferred embodiment of our invention does incorporate this feature of varying cross-sections; however, advantages of the invention may be obtained without it.

Upon removal of the locking pins the troughs may be lowered by hand to their respective decks. It will be seen, best in Figure 2, that the four troughs have at their opposite ends short support shafts 33, 34, 35, 36, respectively, each of which extends longitudinally of the trough and which is held by a flange member 23 to the trough. In the embodiment illustrated, each of short shafts is threaded at one end into the flange member which, in turn, is held by screws 25 to the trough.

Stop pins 40, 41, 42, respectively partially block and pin 39 wholly blocks the channels of the two upright members at the feeding level of each deck. There are four such pins disposed in each channel member, one for each deck. The pins partially blocking the channels define a gap through which a trough support shaft up to a certain size may pass. Each of the stop pins 40, 41, 42 is of such a size relative to the shafts of the troughs to permit the downward passage of the lower disposed troughs, and of a size to block the downward passage of the trough to be held at the particular deck. In the trough attachment illustrated, the support shafts 33, 34, 35, 36 of the troughs are of varying sizes, with the shafts of the upper trough having a diameter of ⅞", the next two diameters of ½" and ⅜" respectively, and shafts of the lowest trough being ¼". The pins are accordingly varied in length so as to stop the trough of the particular deck but to permit the downward movement of the troughs belonging to the lower dacks. As seen best in Figures 4 and 5, the stop pins (except the lower pin) pass through one side of the channel member and stop short of the other side. The gap left is greatest at the stop pin of the upper deck and is progressively smaller with each succeeding lower deck, and as illustrated in Figure 5, the stop pin of the bottom deck completely blocks the channel.

Figure 2:
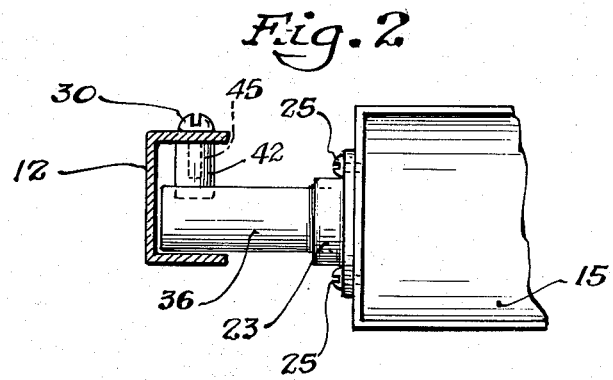
Figure 2 is an enlarged and fragmentary cross sectional view taken along line 2—2 of Figure 4, illustrating in detail the manner of supporting the troughs.

These stop pins may be held in place by various means. We prefer to internally tap 45 the stop pin to receive a screw 30 (Fig. 2).

In removing the chicken or other poultry from the feeding battery of Figure 1, the four troughs are lifted vertically into a nestled position as illustrated in Figures 3 and 4, where they are locked in place by the pins 20 which span the channel of each upright member beneath the support shafts of the lower trough 18. The doors of the decks of the several decks may then be opened to remove the poultry. After replacement of these birds with others to be station-fed, the pins 20 are withdrawn and the nestled troughs are lowered to their respective decks at which point each is prevented from dropping lower by the appropriate stop pin.

Obviously, many modifications and variations of the invention as hereinbefore set forth may be made without departing from the spirit and scope thereof, and therefore only such limitations should be imposed as are indicated in the appended claims.

We claim:

1. A feeding trough arrangement for use with a poultry feeding battery having a plurality of superposed feeding decks, said arrangement comprising: two spaced vertically-disposed track members for attachment to said battery, a plurality of horizontally-disposed feeding troughs slidably carried in superposed relationship between said tracks and movable vertically thereof, means for placing a single one of each trough in feeding position opposite a single one of said decks and within reach of the poultry of that deck, and means for holding said troughs in a nestled position upon vertical movement of the troughs away from their respective decks.

2. A feeding trough arrangement for use with a poultry feeding battery having a plurality of superposed feeding decks, said arrangement comprising: two spaced upright channel members for attachment to opposite ends of said battery, said members being U-shaped in cross-section with the channel of each opening toward the other, several horizontal and superposed feeding troughs spaced from said battery, each of said troughs having a short shaft extending from each of its ends into the channel of the adjacent upright members, stop pins placed at the feeding levels of the several decks within said channel members, the respective pins and shafts being of a relative size to permit the downward passage of the lower disposed troughs and of a size to block the downward passage of the trough of the particular deck, and means for holding the several troughs in a nestled position upon vertical movement of the troughs away from their respective decks.

3. An apparatus as described in claim 2, wherein each succeedingly lower trough has a cross-section somewhat larger than the trough immediately above it.

References Cited in the file of this patent

UNITED STATES PATENTS

| | | |
|---|---|---|
| 1,192,867 | Collis | Aug. 1, 1916 |
| 2,041,049 | Crawford | May 19, 1936 |
| 2,068,566 | Olson et al. | Jan. 19, 1937 |
| 2,314,344 | Cornell | Mar. 23, 1943 |
| 2,339,043 | Armstrong | Jan. 11, 1944 |